United States Patent
Christopherson et al.

(10) Patent No.: US 10,681,573 B2
(45) Date of Patent: Jun. 9, 2020

(54) SYSTEM AND METHODS FOR IDENTIFYING AND LOCATING DISTINCT INTERFERENCE SOURCES IN A WIRELESS NETWORK

(71) Applicant: Verizon Patent and Licensing Inc., Arlington, VA (US)

(72) Inventors: Corey J. Christopherson, Bainbridge Island, WA (US); Fred Weisbrod, Renton, WA (US); Ronald J. Lawrence, Wenatchee, WA (US); Donna L. Polehn, Bellevue, WA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 68 days.

(21) Appl. No.: 15/973,158

(22) Filed: May 7, 2018

(65) Prior Publication Data
US 2019/0342775 A1 Nov. 7, 2019

(51) Int. Cl.
*H04W 24/08* (2009.01)
*H04W 72/08* (2009.01)
*H04W 88/08* (2009.01)

(52) U.S. Cl.
CPC ........ *H04W 24/08* (2013.01); *H04W 72/082* (2013.01); *H04W 88/08* (2013.01)

(58) Field of Classification Search
USPC ............................................. 370/252
See application file for complete search history.

(56) References Cited

U.S. PATENT DOCUMENTS

| | | | |
|---|---|---|---|
| 2017/0079057 A1* | 3/2017 | Chen | H04W 72/12 |
| 2017/0359752 A1* | 12/2017 | Yousefi'zadeh | H04W 36/22 |
| 2019/0029031 A1* | 1/2019 | Kumar | H04L 5/003 |

* cited by examiner

*Primary Examiner* — Gregory B Sefcheck
*Assistant Examiner* — Majid Esmaeilian

(57) ABSTRACT

A system described herein may provide a mechanism for identifying unique sources of interference in a wireless telecommunication network. A unique noise signature, associated with a particular source of radio frequency ("RF") interference, may be identified by detecting physical resource blocks ("PRBs"), in a sector, that exhibit excessive interference, as compared to surrounding PRBs. The unique noise signature may be detected across multiple sectors, and a location of the interference source may be determined. Corrective action may be taken once an interference source is detected, such as by ceasing to utilize, or by reducing the utilization of, affected PRBs.

20 Claims, 13 Drawing Sheets

Unknown UAVs operating on licensed spectrum

Base station serving licensed spectrum
(Interference caused by unknown interference source)

| Time window | PRBs with excess interference | PRBs with excess interference (hash) |
|---|---|---|
| 1 | 6, 10 | A |
| 2 | 6, 7, 9 | B |
| 3 | 5, 7, 10 | C |
| 4 | 6, 9 | D |
| 5 | 6, 7, 9 | B |
FIG. 10
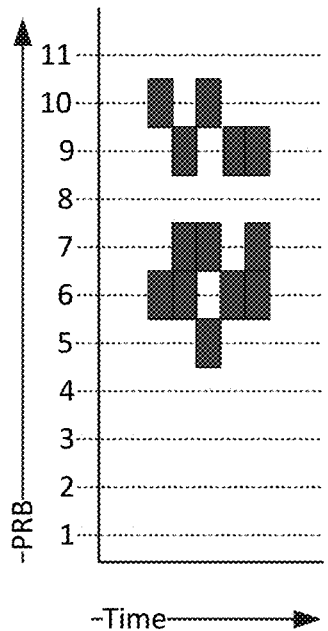
FIG. 11A
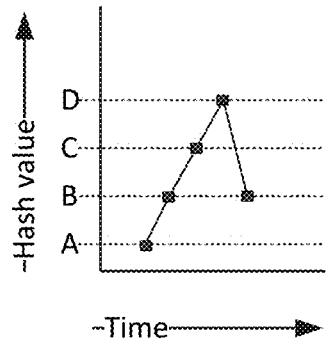
FIG. 11B

US 10,681,573 B2

SYSTEM AND METHODS FOR IDENTIFYING AND LOCATING DISTINCT INTERFERENCE SOURCES IN A WIRELESS NETWORK

BACKGROUND

Wireless telecommunications networks may operate on portions of the radio frequency ("RF") spectrum. In some situations, interference may be caused in such a way that is detrimental to the performance of a given wireless telecommunications network. The cause or source of the interference may not always be easily detectable by an operator of the wireless telecommunications network.

BRIEF DESCRIPTION OF THE DRAWINGS

FIG. 10 illustrates a data structure that may be used to indicate, on a per-time window basis, PRBs that have experienced excessive RF interference;

FIGS. 11A and 11B are example graphical representations of the information stored in the data structure of FIG. 10;

DETAILED DESCRIPTION OF THE PREFERRED EMBODIMENTS

The following detailed description refers to the accompanying drawings. The same reference numbers in different drawings may identify the same or similar elements.

Wireless telecommunications providers may operate wireless networks (e.g., cellular or other types of wireless networks) at a given set of frequencies (or frequency bands) of the RF spectrum. While these frequencies are often licensed (e.g., by a governmental agency and/or by some other authority) for exclusive use by one entity or operator, some bands may be shared by multiple different entities. For instance, a portion of the RF spectrum may be designated for "shared access," or a portion of the RF spectrum that was previously licensed for access by one entity may be licensed for additional entities. In situations where the same portion of the RF spectrum is licensed for use by distinct entities, the use of that portion of the RF spectrum by one entity may negatively impact the use of that portion of the RF spectrum by other entities.

Figure 1:
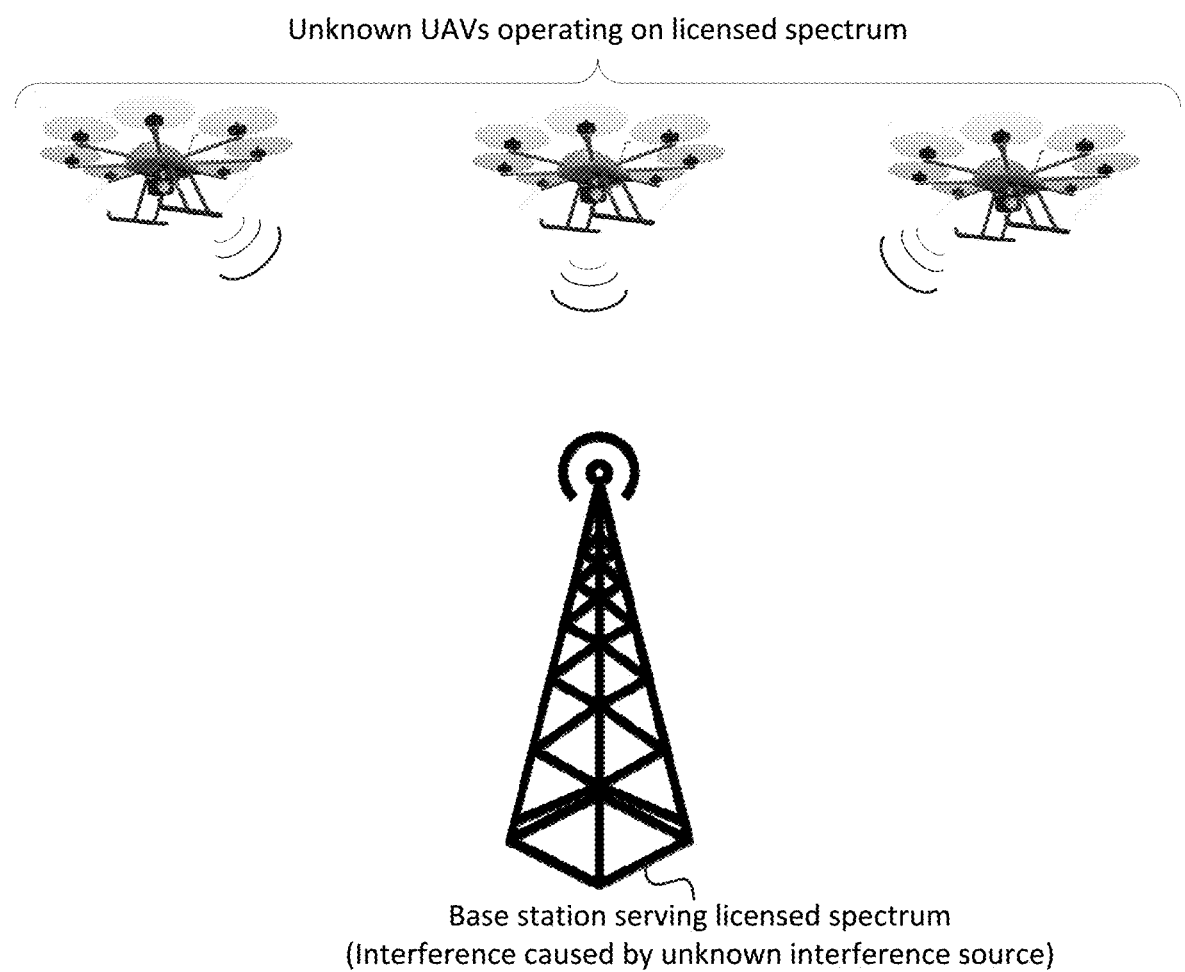
FIGS. 1 and 2 illustrate an example situation in which interference may be caused in a wireless telecommunications network by one or more unknown interference sources.

For example, and as shown in FIG. 1, one entity may cause excessive RF interference (referred to herein simply as "interference" or "noise"). For example, assume that a base station, associated with one entity (such as a wireless telecommunications provider) operates at a particular frequency band. Further assume that a set of devices, such as unmanned aerial vehicles ("UAVs"), which are associated with another entity (e.g., an e-commerce company, a shipping company, an aerial photography company, etc.), also operate within the same frequency band or emit RF interference into that band because of intermodulation, excessive power, poor filter design, or for other reasons. These UAVs may negatively impact the operation of the base station (and/or of devices that communicate with the base station, such as mobile telephones, Internet of Things ("IoT") devices, Machine-to-Machine ("M2M") devices, etc.), such as by introducing RF interference or noise. Because these devices (e.g., the UAVs shown in FIG. 1) are associated with an entity that is separate from the entity that owns and operates the base station, it may be difficult to coordinate the operation of the base station to account for the unexpected and unpredictable interference caused by the devices.

Figure 2:
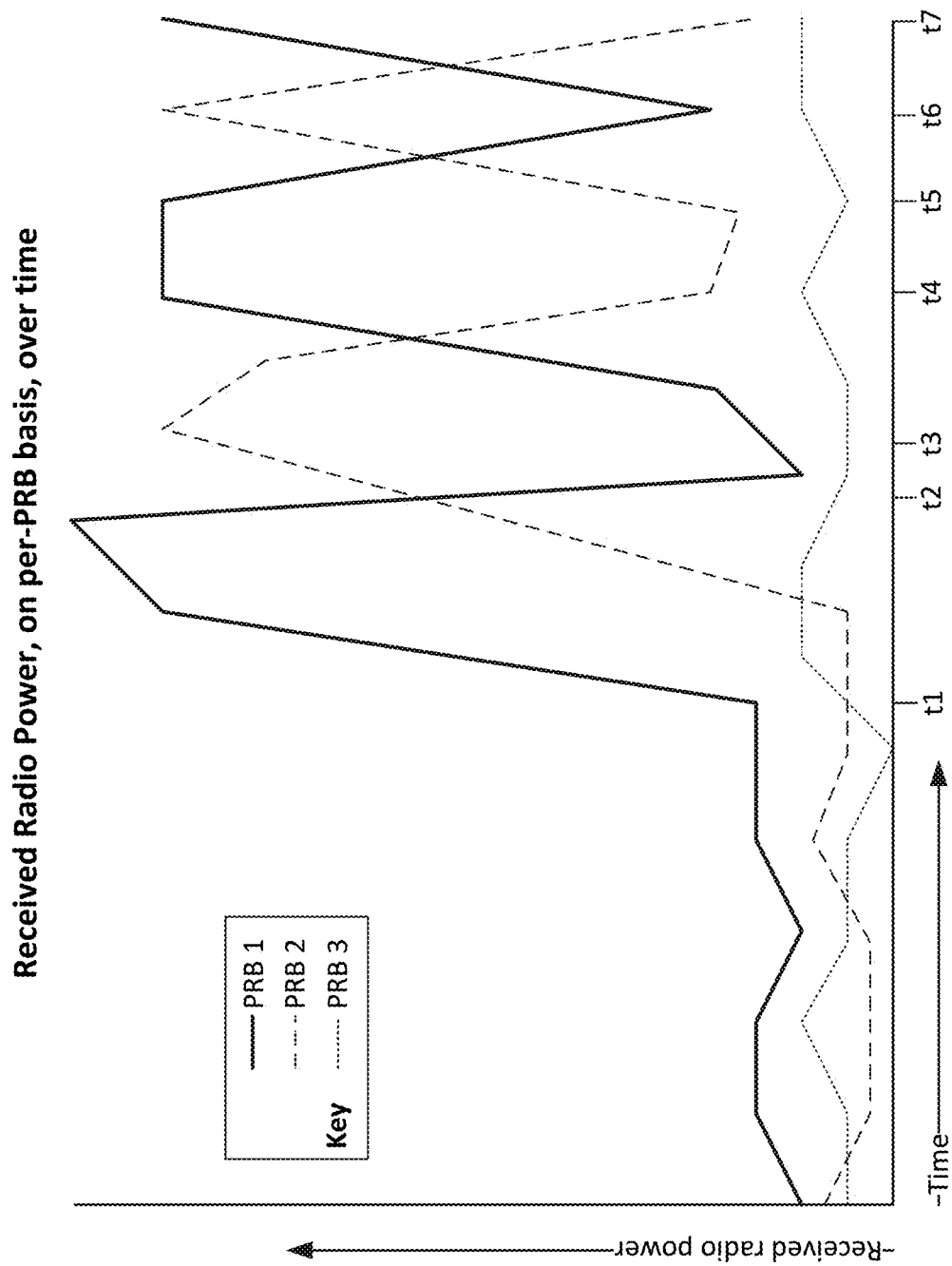

Additionally, and as further shown in FIG. 2, the interference may be caused in random or unpredictable ways, such as by "hopping" (e.g., where a device or set of devices access different sub-bands within a given frequency band, or different PRBs within a given set of PRBs, over time), which may further make it difficult to predict and account for the interference caused by these devices. An example of the effects of such "hopping" are shown in FIG. 2. The received radio power (which may be measured in terms of, for example, decibel-milliwatts (dBm)), over time, is shown in the graph of FIG. 2. Each line in the graph represents a different PRB (where a PRB refers to a time-and-frequency resource) associated with a wireless telecommunications network. Assume, for the purposes of this figure, that the graphed received radio power is the radio power measured at one particular base station of the wireless telecommunications network, where the base station is associated with at least three PRBs (referred to in the figure as PRB1, PRB 2, and PRB 3).

As shown, at time t1, the received radio power on PRB 1 may sharply increase to a relatively high level, while the received radio power on PRB 2 and PRB 3 may remain relatively steady and relatively low. This may indicate that an interference source is present and is utilizing PRB 1. In some situations, this interference source may be an unknown interference source (e.g., a device or set of devices, of which an owner or operator of the base station is unaware). As further shown, the received radio power on PRB 1 may subsequently sharply fall, while at roughly the same time, the received radio power on PRB 2 may sharply increase. As they sharply change, the measures of received radio power on PRB 1 and PRB 2 may intersect at time t2, which may be a factor in determining that "hopping" is occurring. While the received radio power on PRB 2 is at a relatively high level (at time t3), the received radio power on PRB 1 may have fallen back to relatively low levels (e.g., similar levels as before the sharp rise at time t1). As additionally shown, the received radio power on PRB 1 may sharply rise again, and may remain high from time t4 to time t5. During this same time, the received radio power on PRB 2 may have sharply fallen. As shown, similar occurrences may be detected at time t6 and time t7.

As described herein, using the received radio power levels on multiple PRBs, over multiple time windows, and further across different geographical locations, unique signatures (e.g., patterns of PRB "hopping") may be detected, which may identify likely sources of interference, including likely locations of the sources of interference. Additionally, once detected, corrective measures may be taken to alleviate the effects of the interference. For example, the network may cease utilizing the affected PRBs, and/or may utilize the PRBs less heavily when interference (e.g., from an external and/or unknown interference source) is detected on the PRBs. Additionally, PRB utilization may be modified in a predictive manner. For instance, in geographic areas that surround an area in which an interference source is detected, the usage of the affected PRBs may be modified. Further still, a route or path of the unknown interference source may be determined based on detecting the interference source's unique signature at a set of locations over time. A future route or path may be predicted based on the detected past route or path, and PRB utilization along the future route or path may be modified, in accordance with some embodiments described herein.

Figure 3:
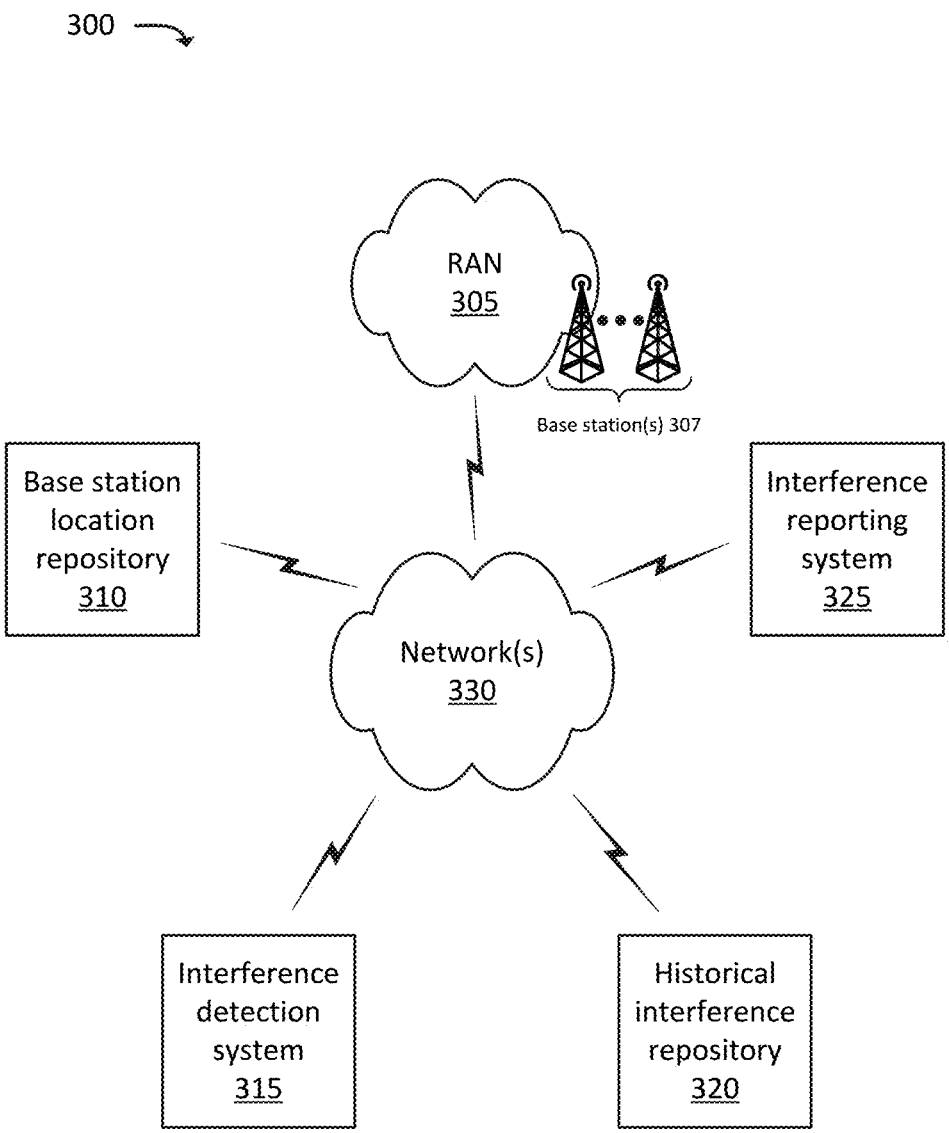
FIG. 3 illustrates an example environment in which one or more embodiments, described herein, may be implemented.

FIG. 3 illustrates an example environment 300, in which one or more embodiments, described herein, may be implemented. As shown in FIG. 3, environment 300 may include radio access network ("RAN") 305, base station location repository 310, interference detection system 315, historical interference repository 320, and interference reporting system 325. The quantity of devices and/or networks, illustrated in FIG. 3, is provided for explanatory purposes only. In practice, environment 300 may include additional devices and/or networks, fewer devices and/or networks, different devices and/or networks, or differently arranged devices and/or networks than illustrated in FIG. 3.

For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

RAN 305 may be, or may include, a wireless telecommunications network (e.g., a Long-Term Evolution ("LTE") RAN, a Third Generation Partnership Project ("3GPP") Fifth Generation ("5G") RAN, etc. RAN 305 may include one or more base stations 307, via which devices (e.g., user equipment ("UE"), such as mobile telephones, IoT devices, M2M devices, etc.) 305 may communicate with one or more other elements of environment 200. RAN 305 may communicate with such devices via an air interface. For instance, RAN 305 may receive traffic (e.g., voice call traffic, data traffic, messaging traffic, signaling traffic, etc.) from a UE via the air interface, and may communicate the traffic to network 330. Similarly, RAN 305 may receive traffic intended for a UE (e.g., from network 330) and may communicate the traffic to the UE via the air interface. RAN 305 may operate at a set of frequencies (e.g., a set of licensed frequencies). In some embodiments, one or more of the frequencies, at which RAN 305 operates, may be shared with an entity other than an entity that owns and/or operates RAN 305.

Base station location repository 310 may include one or more devices (e.g., a server device, or a collection of server devices) that perform one or more functions described herein. For example, base station location repository 310 may receive, store, and/or output information identifying geographic locations of one or more base stations 307.

Interference detection system 315 may include one or more devices (e.g., a server device, or a collection of server devices) that perform one or more functions described herein. For example, interference detection system 315 may detect unique sources of interference detected in RAN 305. Interference detection system 315 may further take corrective action when detecting unique sources of interference, as described in greater detail below.

Historical interference repository 320 may include one or more devices (e.g., a server device, or a collection of server devices) that perform one or more functions described herein. For example, historical interference repository 320 may receive, store, and/or output information regarding interference sources detected by interference detection system 315, including times and/or locations at which unique sources of interference were detected.

Interference reporting system 325 may include one or more devices (e.g., a server device, or a collection of server devices) that perform one or more functions described herein. For example, interference reporting system 325 may include one or more messaging systems, which are capable of generating and/or sending messages via network 330. As described herein, the messages may be emails, text messages, application-specific messages, and/or other types of messages related to alerts that interference sources have been detected and/or located by interference detection system 315.

Network(s) 330 may include one or more wired and/or wireless networks. For example, Network(s) 330 may include one or more core networks of a licensed wireless telecommunications system (e.g., an LTE core network, a 5G core network, etc.), an Internet Protocol ("IP")-based PDN, a wide area network ("WAN") such as the Internet, a private enterprise network, and/or one or more other networks. One or more of the devices or networks shown in FIG. 3 may communicate, through network(s) 330, with each other and/or with other devices that are not shown in FIG. 3. Network 330 may further include, or be connected to, one or more other networks, such as a public switched telephone network ("PSTN"), a public land mobile network ("PLMN"), and/or another network.

Figure 4:
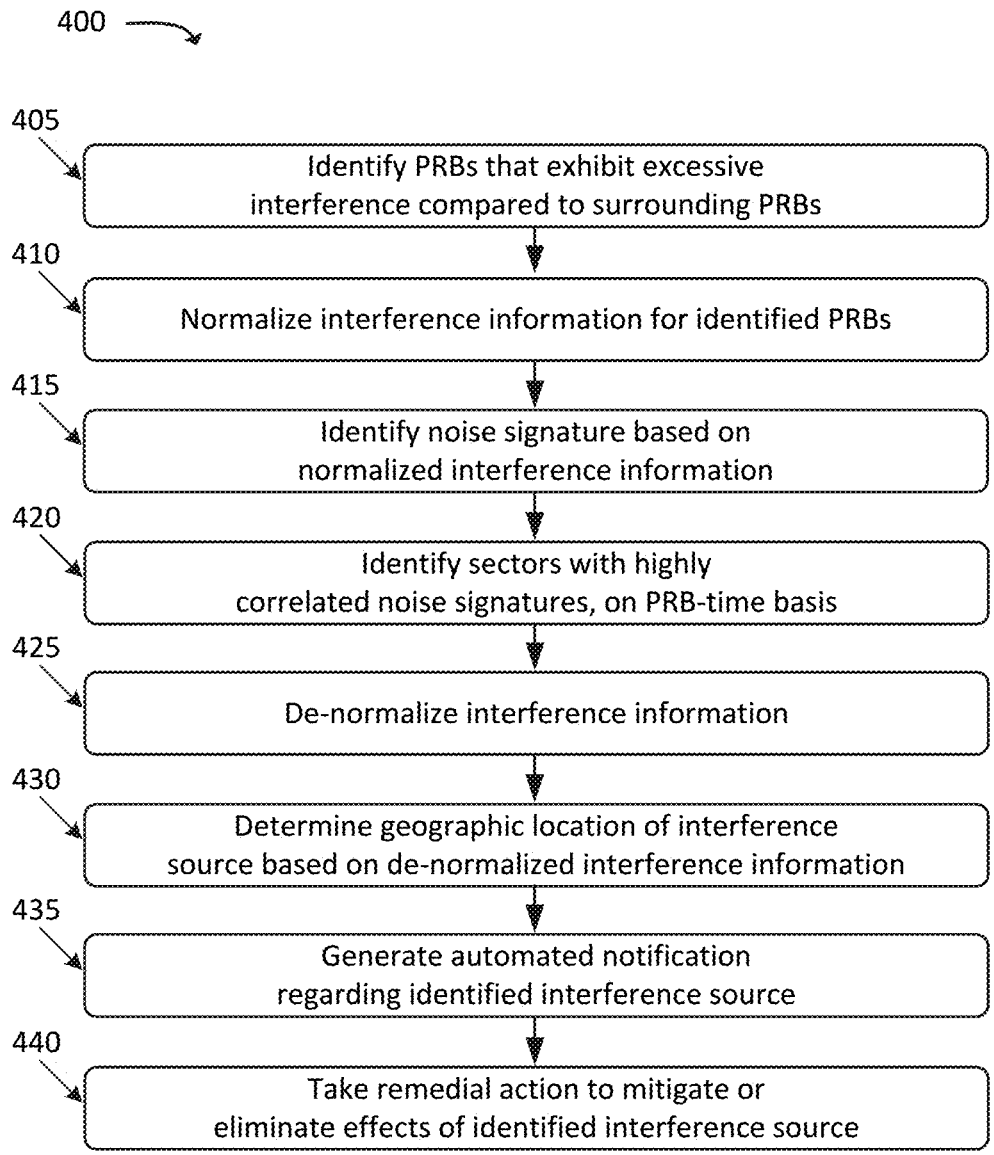
FIG. 4 illustrates an example process for identifying an interference source in a wireless network, and for taking corrective action.

FIG. 4 illustrates an example process 400 for identifying an unknown source of interference, and for taking corrective action. In some embodiments, process 400 may be performed by interference detection system 315. In some embodiments, process 400 may be performed by, or in conjunction with, one or more other devices or systems, such as base station location repository 310, historical interference repository 320, and/or interference reporting system 325. FIG. 4 is described in conjunction with FIGS. 5-15. Some of these figures include graphs or other graphical representations of data, which may be generated by interference detection system 315. In some embodiments, the figures graphically illustrate calculations, aggregation, analysis, and/or other types of operations that may be performed by interference detection system 315.

Process 400 may include identifying (at 405) PRBs that exhibit excessive interference, compared to surrounding PRBs. For example, for a given sector (e.g., where "sector" refers to a particular geographic region, which may approximately or precisely correspond to the coverage area of a particular base station, or a set of base stations, of a wireless telecommunications network) and over a given time window (e.g., one minute, one hour, one day, one week, etc.), the received radio power, per PRB, may be measured.

Figure 5:
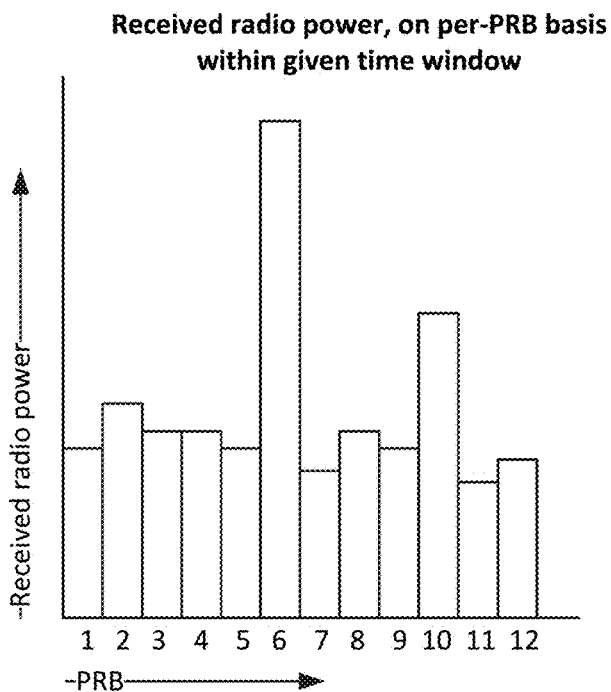
FIG. 5 illustrates an example of received radio power, on a per-physical resource block ("PRB") basis, within a given time window.

For instance, FIG. 5 includes a graph that shows an example of received radio power, on a per-PRB basis, at a given sector and within a given time window. The received radio power may, in some embodiments, be plotted based on an average of the received radio power measured over the time window. However, in some embodiments, the received radio power may be plotted based on some other function of the received radio power measured over the time window (e.g., the maximum received radio power measured over the time window, the minimum received radio power measured over the time window, the 75th percentile of received radio power measured over the time window, the 25th percentile received radio power measured over the time window, and/or some other function).

Figure 6A:
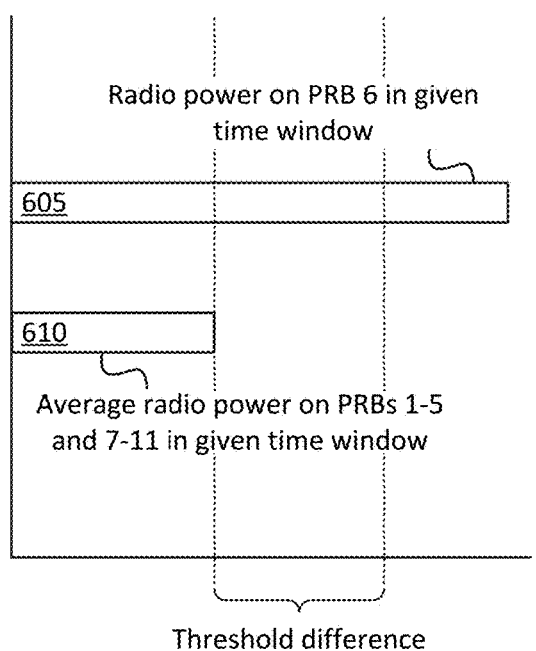
FIGS. 6A and 6B each illustrate the variation between the received radio power, for a given PRB within a given time window, and the received radio power of neighboring PRBs.

As shown, the received radio power measured on PRB 6 and PRB 10, at the sector and over the time window, may be relatively high, as compared to the other PRBs. The relatively high received radio power may be indicative of an interference source. FIG. 6A shows another example of how interference detection system 315 may analyze and/or aggregate interference information (e.g., as shown in FIG. 5). That is, the graph in FIG. 6A may be another representation of some of the data shown in FIG. 5. Bar 605 may represent the received radio power on PRB 6, at the sector and during the time window, while bar 610 may represent the average received radio power on PRBs "surrounding" PRB 6. In this example, the five PRBs having higher numbers and the five PRBs having lower numbers than PRB 6 (i.e. PRBs 1-5 and 7-11) are considered the "surrounding" PRBs of PRB 6. In practice, the "surrounding" PRBs may be considered differently, such as the four PRBs having a higher number and the four PRBs having a lower number; the two PRBs having a higher number and the three PRBs having a higher number; PRBs that are at least one PRB separated from a given PRB (e.g., PRBs 1-4 and 8-12 when PRB 6 is the given PRB); etc.

As shown in FIG. 6A, the received radio power on PRB 6 may be much higher than the average received radio power on PRBs 1-5 and 7-11. In this example, the difference in magnitude between the received radio power on PRB 6 and the average received radio power on the surrounding PRBs may exceed a threshold difference. Based on the difference in magnitude between the received radio power on PRB 6 and the average received radio power on the surrounding PRBs exceeding the threshold difference, interference detection system 315 may identify PRB 6 as exhibiting interference (e.g., "excessive" interference), at the given sector and during the given time window.

Figure 6B:
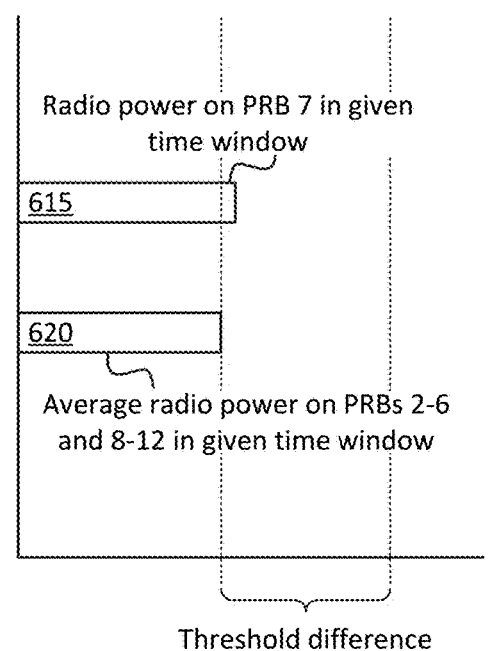

In contrast, FIG. 6B shows an example of a PRB that would not be considered to exhibit excessive interference. As shown, bar 615 represents the received radio power measured on PRB 7, and bar 620 represents the received radio power measured on the PRBs surrounding PRB 7 (i.e., PRBs 2-6 and 8-12, in this example). While the magnitude of the received radio power on PRB 7 exceeds the magnitude of the average received radio power on the surrounding PRBs, the magnitude of the received radio power on PRB 7 does not exceed the magnitude of the average received radio power on the surrounding PRBs by the threshold amount. Therefore, PRB 7 would not be identified as exhibiting excessive interference, at the given sector and during the given time window.

Figure 7:
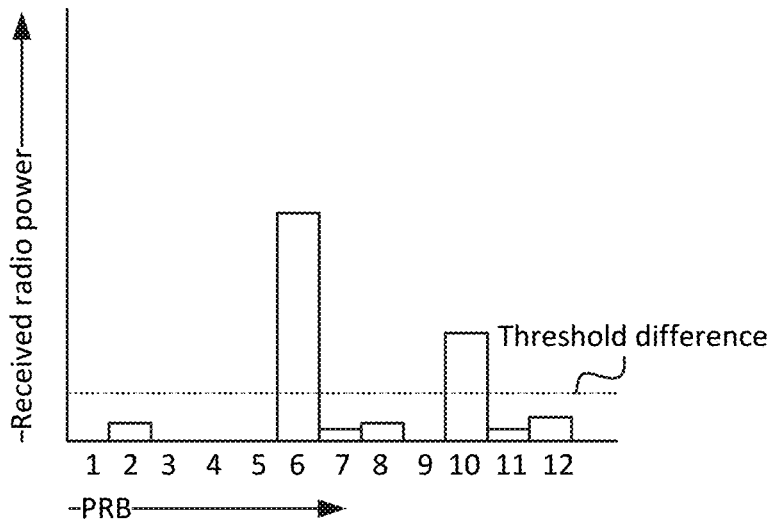
FIG. 7 illustrates the variation in received radio power, for each PRB out of a set of PRBs, and the respective surrounding PRBs.

FIG. 7 illustrates another example representation of the information shown in FIGS. 6A and 6B. Specifically, FIG. 7 illustrates the difference between the magnitude of received radio power on each PRB, as compared to the magnitude of average received radio power on the surrounding PRBs. For instance, as shown, the difference between the magnitude of received radio power on PRB 6, as compared to the magnitude of average received radio power on the surrounding PRBs may be relatively high, and may further exceed the threshold difference mentioned above. As also shown, the difference between the magnitude of received radio power on PRB 7, as compared to the magnitude of average received radio power on the surrounding PRBs may be relatively low, and may not exceed the threshold difference. PRB 10 may also exhibit excessive interference, as the measured received radio power on PRB 10 may also exceed the average received radio power of the PRBs surrounding PRB 10. For the purposes of this figure, PRBs that exhibit lower received radio power than the average received radio power of surrounding PRBs are shown as corresponding to a value of 0; however in practice, the negative difference may be plotted and/or otherwise recorded. Thus, as is shown in FIG. 7, interference detection system 315 may ultimately identify PRBs 6 and 10 as exhibiting excessive interference, as compared to surrounding PRBs, at the given sector and within the given time window.

In some embodiments, interference detection system 315 may filter out PRBs with constant interference over time. For example, when detecting PRBs that exhibit excessive interference, interference detection system 315 may omit PRBs that exhibit excessive interference (e.g., as compared to surrounding PRBs) over at least a threshold quantity of time windows (e.g., a threshold quantity of consecutive time windows, and/or a threshold quantity or ratio of time windows within a particular quantity of time windows (e.g., 7 time windows out of 10)).

Returning to FIG. 4, process 400 may also include normalizing (at 410) interference information for the identified PRBs. For example, while PRB 6 may exceed the threshold difference by a relatively large amount and PRB 10 may exceed the threshold difference by a relatively small amount (e.g., as shown in FIG. 7), these differences may be normalized for the purpose of subsequent operations. For instance, as shown in FIG. 8, PRBs 6 and 10 may be plotted with a value of 1, while the other PRBs are plotted with a value of 0.

Process 400 may additionally include identifying (at 415) a noise signature based on the normalized interference information. For example, interference detection system 315 may perform blocks 405 and 410, over time, in order to identify a noise signature (e.g., which may be indicative of an interference source "hopping" between PRBs).

Figure 8:
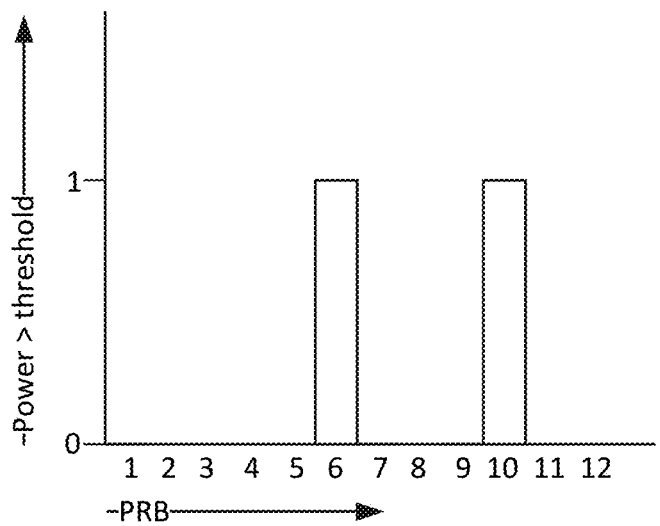
FIG. 8 illustrates a normalized version of the variation in received radio power illustrated in FIG. 7.
Figure 9A:
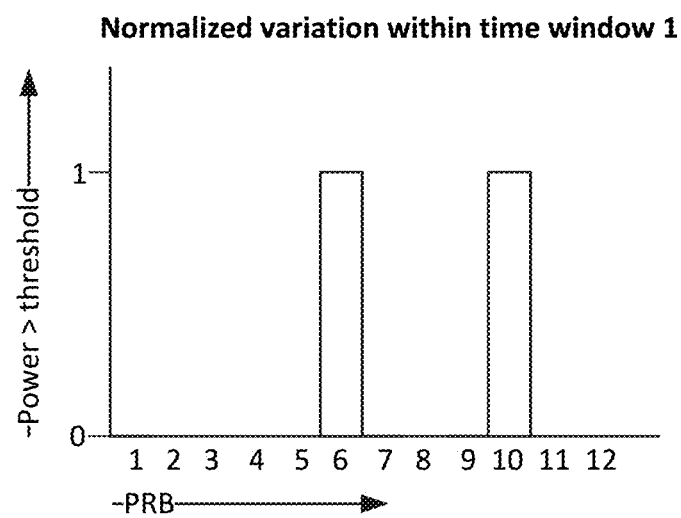
FIGS. 9A and 9B illustrate normalized versions of the variation in received radio power (e.g., as shown in FIG. 8), in different time windows.
Figure 9B:
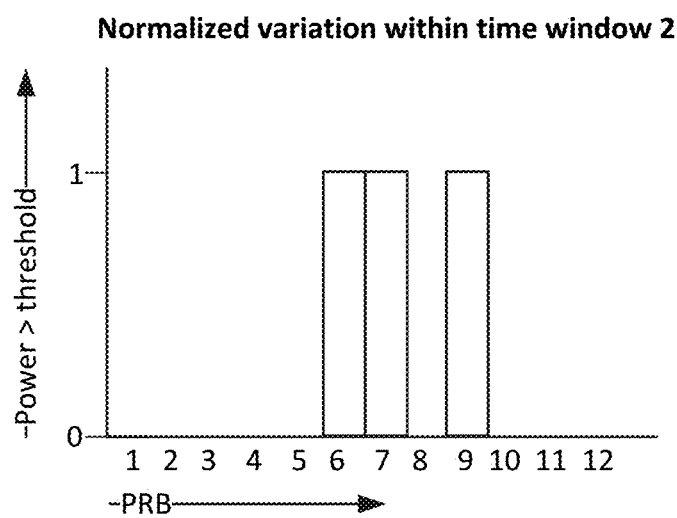

FIGS. 9A and 9B illustrate similar concepts as those shown in FIG. 8, but over the course of different time windows. For example, FIG. 9A illustrates that interference detection system 315 has identified that PRBs 6 and 10 exhibit excessive interference (e.g., have a value of 1) in a first time window ("time window 1"), while PRBs 6, 7, and 9 exhibit excessive interference in a second time window ("time window 2").

FIG. 10 illustrates an example data structure 1000, which is another representation of data that indicates PRBs that exhibit excessive interference over time. As shown, data structure 1000 may indicate that PRBs 6 and 10 were identified as exhibiting excessive interference during time window 1 (e.g., as indicated in FIG. 9A), that PRBs 6, 7, and 9 were identified as exhibiting excessive interference during time window 2 (e.g., as indicated in FIG. 9B), and so on. Additionally, data structure 1000 may indicate that PRBs 5, 7, and 10 were identified as exhibiting excessive interference during time window 3, that PRBs 6 and 9 were identified as exhibiting excessive interference during time window 4, and that PRBs 6, 7, and 9 were identified as exhibiting excessive interference during time window 5. In some embodiments, data structure 1000 may include a value, such as a hashed value that is obtained as a result of hashing the PRBs identified in a row, which may be useful in a correlation analysis over multiple sectors (as discussed below with regard to operation 420). For example, the hash value "A" may represent PRBs 6 and 10, "B" may represent 6, 7, and 9, "C" may represent 5, 7, and 10, and "D" may represent 6 and 9.

FIGS. 11A and 11B shows graphical representations of the information stored in data structure 1000. Each block, in the graph of FIG. 11A, may indicate that excessive interference was identified at a given PRB and within a given time window. For example, blocks are shown at the same time for PRBs 6 and 10; for PRBs 6, 7, and 9; for PRBs 5, 7, and 10, and so on (where the blocks shown in FIG. 11A correspond to the PRBs that exhibit excessive interference per time window in data structure 1000). FIG. 11B show the hash values being plotted over time. Correlation analysis (e.g., as discussed below) may consume less processing power and/or time, and/or may be more accurate, when analyzing hashed values (as shown in FIG. 11B) than when analyzing raw values (e.g., as shown in FIG. 11A).

Figure 12A:
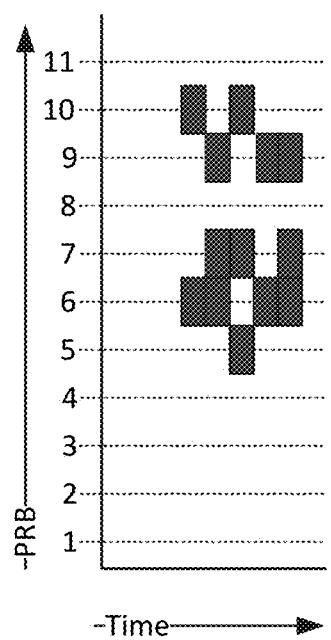
FIGS. 12A-12D illustrate similar graphical representations as shown in FIG. 11, for different sectors of a wireless network.
Figure 12B:
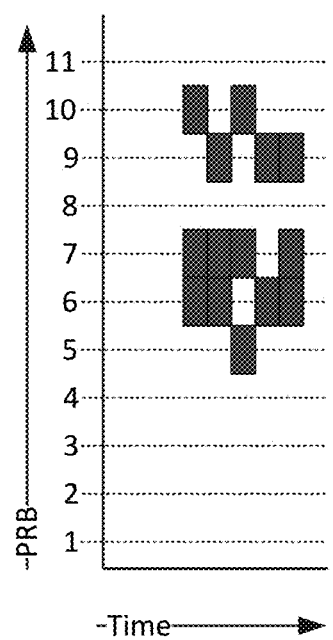
Figure 12C:
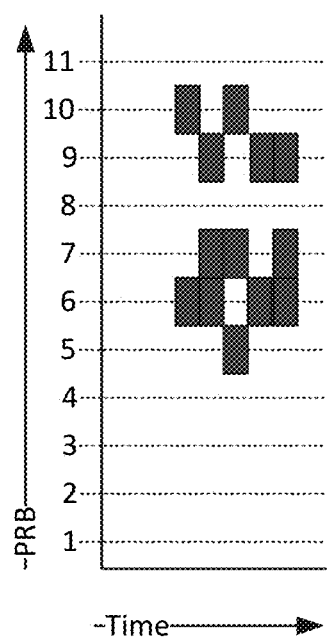
Figure 12D:
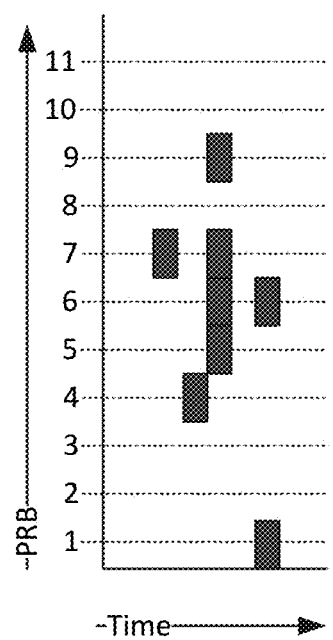

While operations 405-415 of FIG. 4 were discussed in the context of a single sector, interference detection system 315 may perform these operations, or similar operations, on multiple sectors to determine noise signatures associated with the multiple sectors. In this manner, interference detection system 315 may determine noise signatures for each sector. FIGS. 12A-12D illustrate similar graphical representations as shown in FIG. 11A, but for multiple different sectors (referred to as examples sectors 1-4). As may be visibly apparent, the noise signature of sector 2 (as shown in FIG. 12B) may be highly similar to the noise signature of sector 1, with the exception that PRB 7 of sector 2 was also identified during the first graphed time window. The noise signature of sector 3 (as shown in FIG. 12C) may be identical to the noise signature of sector 1. As further shown, the noise signature identified in sector 4 (as shown in FIG. 12D) may be relatively dissimilar to the noise signature of sectors 1-3.

Figure 13:
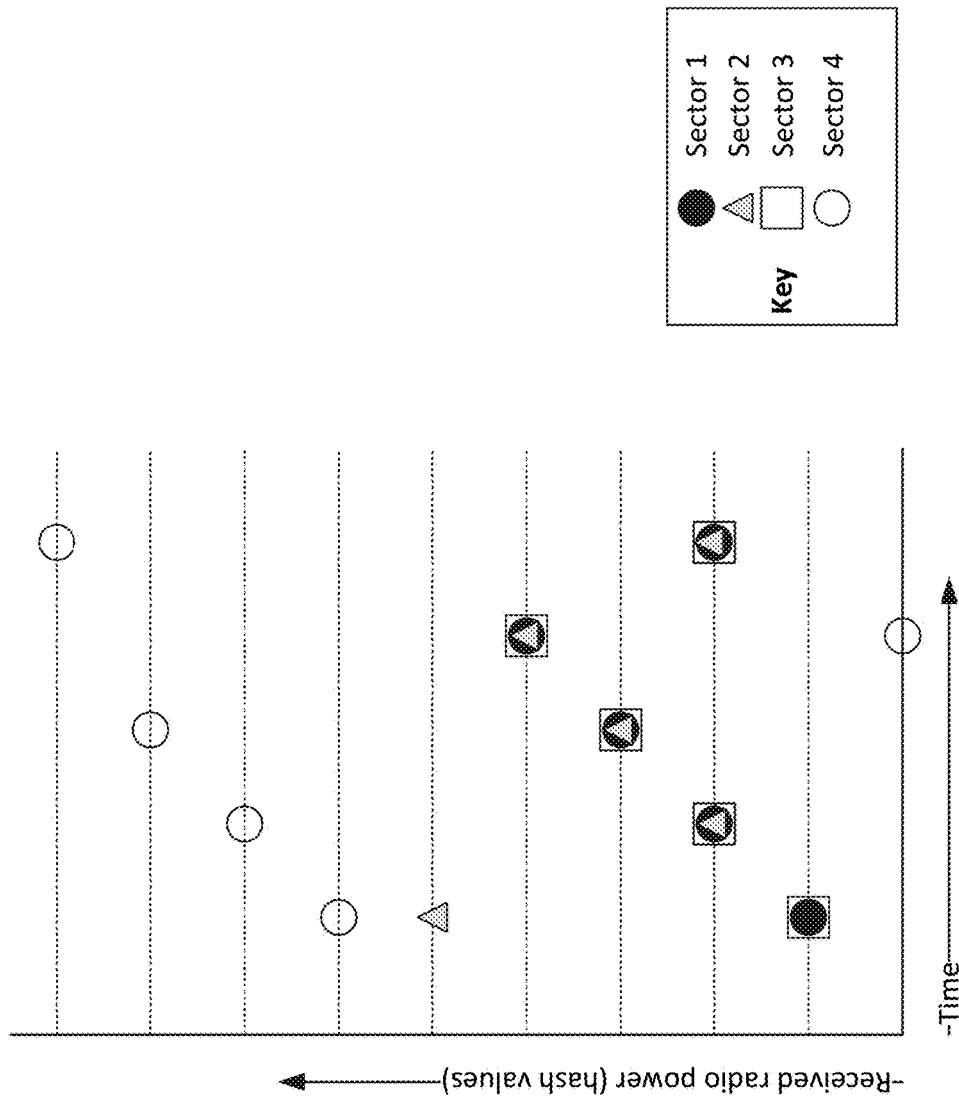
FIG. 13 illustrates a graphical representation of hash values, that correspond to interference patterns, measured at multiple sectors.

Process 400 may further include identifying (at 420) sectors with highly correlated noise signatures, on a PRB-time basis. For instance, interference detection system 315 may use any suitable correlation analysis technique, machine learning technique, neural network-based technique, and/or other type of technique to identify PRBs that exhibit similar noise signatures. For the sake of brevity, such techniques will be described herein in the context of correlation analysis. Interference detection system 315 may perform the correlation analysis on noise signatures that are denoted by hashed values (e.g., where a particular hashed value represents a set of PRBs on which excessive interference was detected in a given time window, as discussed above). FIG. 13 illustrates an example of hashed noise signatures of example sectors 1-4 (e.g., hashed versions of the noise signatures shown in FIGS. 12A-12D). As may be visibly apparent, the hashed noise signatures associated with sectors 1-3 may be relatively similar (or identical), while the hashed noise signature associated with sector 4 is substantially dissimilar to the hashed noise signatures of any of sectors 1-3.

In some embodiments, interference detection system 315 may perform the correlation analysis on any number or arrangement of sectors. For example, sectors may be grouped into groups of sectors that generally correspond to a region (e.g., a city, a group of cities, a state or province, a group of states or provinces, a country, etc.), and interference detection system 315 may identify which sectors, within a given group of sectors, are correlated. As used herein, sectors may be considered as "correlated" when a value, that indicates correlation between the sectors (e.g., as determined as a result of a suitable correlation analysis) exceeds a threshold value. For example, on a scale of 0 to 1, where a value of 0 indicates no correlation and a value of 1 indicates an exact match, the threshold value may be 0.8. In practice, different scales than 0 to 1 may be used, and different threshold values may be used to determine whether noise signatures of sectors are considered correlated.

As mentioned above, the correlation analysis may be performed in any suitable way, which may include iterating through each sector, out of a group of sectors, as a reference sector against which each sector is compared. In this manner, a matrix may be constructed that indicates the correlation of each sector with every other sector in the group of sectors. While examples of how the correlation analysis may be performed are provided above, in practice, any suitable technique may be used to determine whether noise signatures, detected in sectors, are similar enough to be considered as "correlated." The identification of the correlated sectors, based on the normalized noise signatures, may indicate sectors that have simultaneously experienced the same noise signature.

As mentioned above, the normalization of the received radio power levels (e.g., to identify PRBs that have exhibited excessive interference) may help clearly identify the presence of the noise signatures and, as described below, the magnitudes of the amounts of interference received radio power levels (e.g., the magnitude of the interference) may help to further identify the actual location of the interference source. Thus, while the identification of the sectors (at 420) may in and of itself be useful in determining or estimating the location of the interference source, de-normalizing the interference levels (as discussed below) may allow for more precise determination of the location of the interference source.

Figures 14A, 14B, 14C:
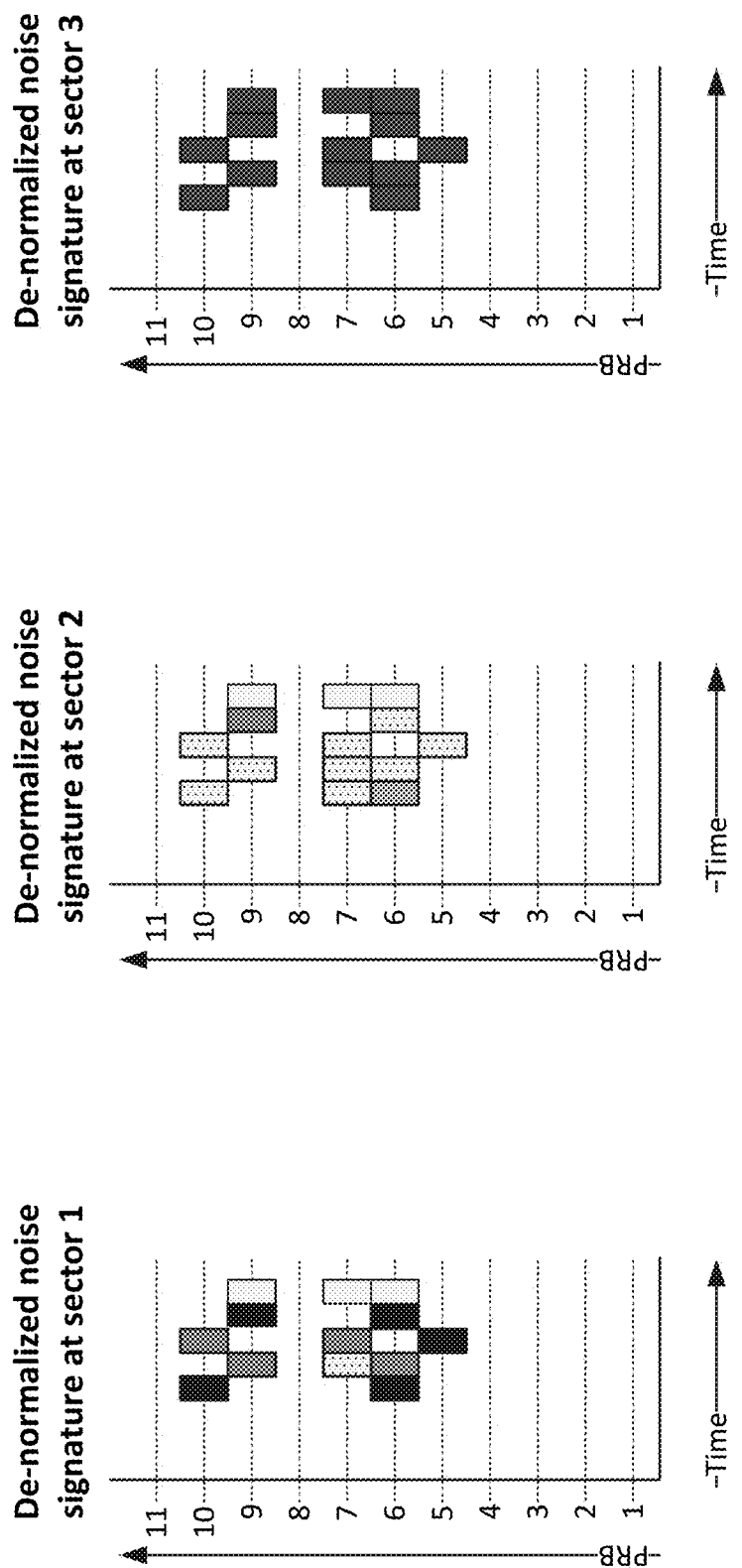
FIGS. 14A-14C illustrate de-normalized versions of the graphical representations shown in FIGS. 12A-12C (e.g., where the normalized versions of the data shown in FIGS. 12A-12C are relatively highly correlated)

Process 400 may also include de-normalizing (at 425) the interference information for the sectors identified as being correlated. That is, interference detection system 315 may reintroduce the magnitudes of the received radio power detected at the sectors (e.g., where an example of magnitudes of received radio power for a sector, on a per-PRB basis, are shown in FIG. 5). FIGS. 14A-14C illustrate example de-normalized noise signatures of sectors 1-3 (e.g., de-normalized versions of the noise signatures shown in FIGS. 12A-12C). The noise signatures in FIGS. 14A-14C may be "de-normalized" in the sense that they reflect the magnitudes of the received radio power on a per-PRB basis (e.g., for PRBs on which excessive interference has been detected). In these figures, a darker shading may reflect a higher amount of noise detected on that PRB during a given time window. The data shown in these figures may, in some embodiments, include only interference information for PRBs that were identified (e.g., at 405) as exhibiting excessive noise, as compared to surrounding PRBs. Thus, while FIGS. 14A-14C may include blank spaces (e.g., no interference is shown for PRBs 1-4 in these figures), the blank spaces may not reflect an absolute lack of interference on these PRBs; they may instead reflect that excessive interference was not identified on those PRBs.

As shown in FIG. 14A, some PRBs of sector 1 may have exhibited a relatively high amount of interference at some times (as indicated by the dark shaded blocks), while some PRBs of sector 1 may have exhibited lower levels of interference at some times (as indicated by the lighter shaded blocks). As shown in FIG. 14B, the PRBs of sector 2, which exhibited excessive interference, may have generally exhibited lower levels of interference than those of sector 1, as denoted by the lighter shaded blocks in FIG. 14B. As shown in FIG. 14C, the PRBs of sector 3, which exhibited excessive interference, may have generally exhibited higher levels of interference than those of sectors 1 and 2, as denoted by the more darkly shaded blocks in FIG. 14C. In some embodiments, the de-normalized interference information (e.g., for a given PRB at a given time) may reflect the amount of received radio power detected at the given PRB at the given time. In some embodiments, the de-normalized interference information for a given PRB at a given time may reflect the excess amount of interference, as compared to its surrounding PRBs (e.g., may reflect the amount of interference above a threshold amount, such as the average received radio power of surrounding PRBs, as discussed above).

Returning to FIG. 4, process 400 may additionally include determining (at 430) the geographic location of the interference source based on the de-normalized interference information. For example, interference detection system 315 may identify geographic locations of the sectors (identified at 420), and/or of hardware that implements the sectors (e.g., one or more base stations 307). The geographic locations may be identified based on information stored by base station location repository 310. Interference detection system 315 may further use the de-normalized interference information (generated at 425) in conjunction with the information identifying the geographic locations of the sectors, in order to determine the geographic location of the interference source.

Figure 15:
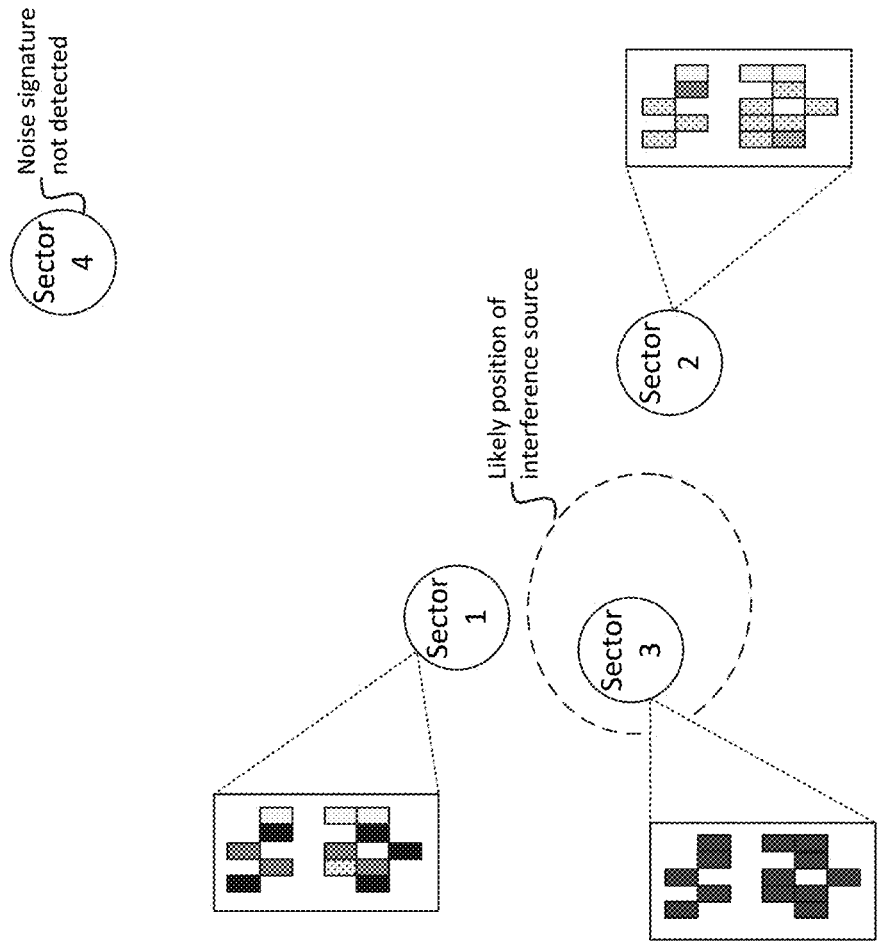
FIG. 15 illustrates an example of using known location information, associated with sectors of the wireless network, and de-normalized interference data (e.g., as shown in FIGS. 13A-13C), to identify the likely location of an interference source in a given time window.

FIG. 15 conceptually illustrates how these various types of information may be used to determine the location of the interference source. As shown, sectors 1-3 may located relatively close together, which may explain why these sectors all exhibited interference consistent with the identified noise signature. Additionally, sector 4 may be located relatively far away from sectors 1-3, which may explain why sector 4 did not exhibit interference consistent with the identified noise signature.

Furthermore, since sector 3 exhibited the highest amounts of interference, it may be determined that the interference source is located in or near sector 3. The likely position of the interference source may be defined by a shape (e.g., an ellipse, a circle, an irregular polygon, etc.), where the bounds of the shape are determined based on the levels of interference, corresponding to the noise signature, exhibited at the sectors in which the noise signature was detected.

Returning to FIG. 4, process 400 may further include generating (at 435) an automated notification regarding the identified interference source. For instance, interference detection system 315 may, based on identifying the noise signature (at 415), determining the affected sectors (at 420), and/or determining the geographic location of the interference source (at 435), generate a notification (e.g., an e-mail, a text message, and/or some other sort of notification message) and send the notification (e.g., via interference reporting system 325) to an administrator, owner, and/or operator of the network in which the sectors operate. In some embodiments, interference detection system 315 may store (e.g., in historical interference repository 320) the information identifying the noise signature itself, the determined location of the interference source, and/or other information regarding the operations performed in process 400.

In some embodiments, further remedial actions may be taken by interference detection system 315. For example, over time (e.g., over the course of minutes or hours), interference detection system 315 may track a path of the interference source. For example, the interference source may travel in a manner consistent with a vehicle driving along a roadway, with a UAV flying over a flight path, etc. In this sense, interference detection system 315 may correlate the determined position of the interference source with information regarding geographical or topographical features, such as roads, tunnels, mountains, buildings, etc.

Using this information, interference detection system 315 may predictively determine likely areas in which the interference source will be located in the future. For instance, if the interference source has been traveling 150 km per hour along a vector (e.g., a relatively straight path) for 2 hours, interference detection system 315 may determine that the interference source will continue along the vector (e.g., will be located 150 km away from its present position in one hour, at a heading that is on or is relatively near the vector). Similarly, if the interference source has been traveling along a particular highway at 100 km for several hours, interference detection system 315 may determine that the interference source will continue traveling along the highway at 100 km (e.g., will be located 100 km away, on the highway, from its present position in one hour).

Interference detection system 315 may also store information (e.g., in historical interference repository 320), indicating the identified positions of interference sources, with date and time information. In this sense, patterns of when unique interference sources (e.g., as identified by their noise signatures) are located at certain locations may be recorded. Further, this type of historical information may be used to predict times at which an interference source may be expected to be present at a given location. For example, if the interference source has been identified at sector 1 between 12 PM and 1 PM every Monday, it may be likely that the interference source will be present at sector 1 between 12 PM and 1 PM on a given Monday.

Based on times and/or locations at which interference sources are located, and/or times and/or locations at which interference sources are expected to be located, interference detection system 315 may take (at 440) remedial action to mitigate or eliminate the negative effects of the identified interference sources. For example, interference detection system 315 may output an instruction to one or more base stations 307 of the affected sector(s), to a controller that controls the operation of the base stations 307, and/or to some other device or system. The instruction may cause the base station(s) 307 of the affected sector(s) to modify the use of the affected PRBs. For example, the instruction may instruct the base station(s) 307 to cease utilizing the PRBs that exhibit excessive interference (e.g., cease allocating the PRBs for use by devices that connect to base stations 307), or to reduce the use of the PRBs that exhibit excessive interference. Interference detection system 315 may instruct these base stations 307 to modify the use of the identified PRBs reactively (e.g., after detecting the noise signature at a given sector), and/or predictively (e.g., when detecting that the interference source is likely to affect a given sector at a given time, as discussed above). By ceasing to use the affected PRBs, or by reducing the usage of the PRBs, the effects of the interference, caused by the interference source, may be mitigated.

Figure 16:
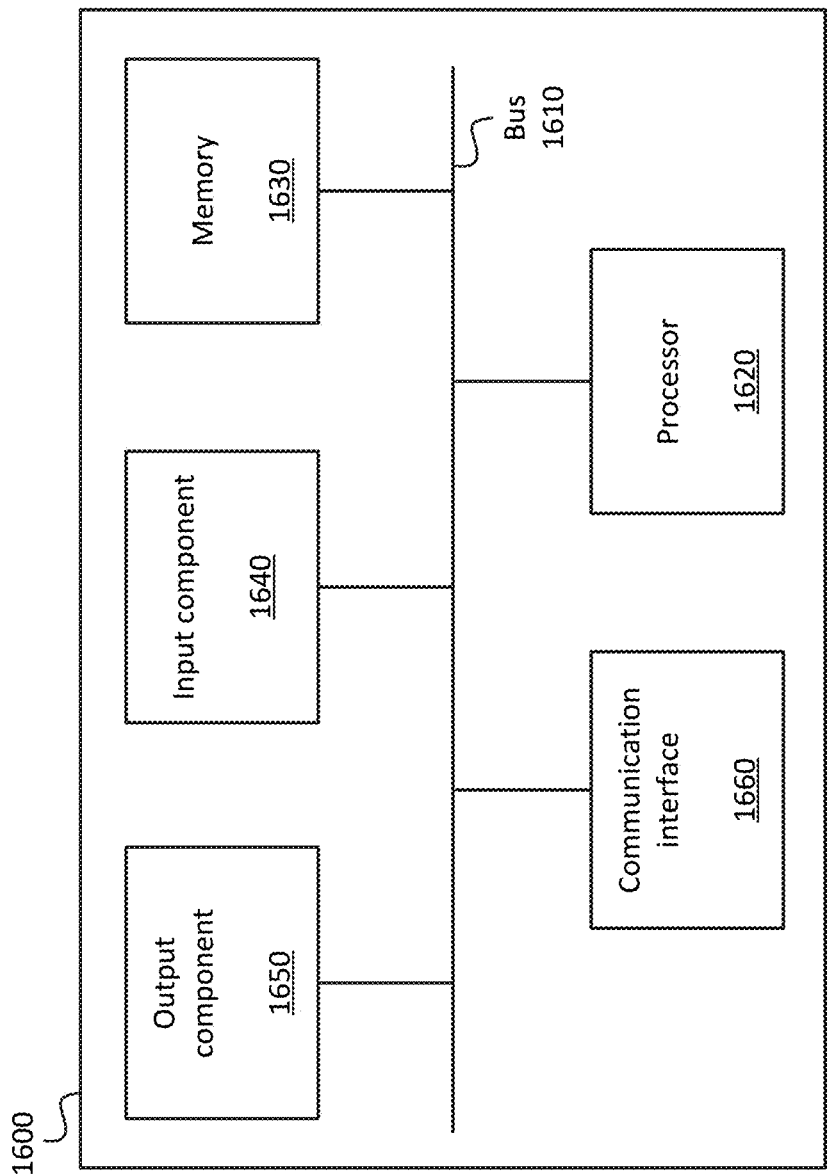
FIG. 16 illustrates example components of one or more devices, according to one or more embodiments described herein.

FIG. 16 illustrates example components of device 1600. One or more of the devices described above may include one or more devices 1600. Device 1600 may include bus 1610, processor 1620, memory 1630, input component 1640, output component 1650, and communication interface 1660. In another implementation, device 1600 may include additional, fewer, different, or differently arranged components.

Bus 1610 may include one or more communication paths that permit communication among the components of device 1600. Processor 1620 may include a processor, microprocessor, or processing logic that may interpret and execute instructions. Memory 1630 may include any type of dynamic storage device that may store information and instructions for execution by processor 1620, and/or any type of non-volatile storage device that may store information for use by processor 1620.

Input component 1640 may include a mechanism that permits an operator to input information to device 1600, such as a keyboard, a keypad, a button, a switch, etc. Output component 1650 may include a mechanism that outputs information to the operator, such as a display, a speaker, one or more light emitting diodes ("LEDs"), etc. Input component 1640 may include one or more input devices and/or sensors (e.g., input devices 305 and/or sensors 325, as described above).

Communication interface 1660 may include any transceiver-like mechanism that enables device 1600 to communicate with other devices and/or systems. For example, communication interface 1660 may include an Ethernet interface, an optical interface, a coaxial interface, or the like. Communication interface 1660 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1600 may include more than one communication interface 1660. For instance, device 1600 may include an optical interface and an Ethernet interface.

Device 1600 may perform certain operations relating to one or more processes described above. Device 1600 may perform these operations in response to processor 1620 executing software instructions stored in a computer-readable medium, such as memory 1630. A computer-readable medium may be defined as a non-transitory memory device. A memory device may include space within a single physical memory device or spread across multiple physical memory devices. The software instructions may be read into memory 1630 from another computer-readable medium or from another device. The software instructions stored in memory 1630 may cause processor 1620 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while a series of blocks has been described with regard to FIG. 4, the order of the blocks may be modified in other implementations. Further, non-dependent blocks may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold" "being greater than or equal to a threshold." "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory computer-readable medium storing a set of processor-executable instructions; and
one or more processors configured to execute the set of processor-executable instructions, wherein executing the set of processor-executable instructions causes the one or more processors to:
identify, in a wireless telecommunications network and during a first time window, a first set of physical resource blocks ("PRBs"), associated with a first portion of the wireless telecommunications network, that exhibit excessive interference compared to one or more other PRBs associated with the same first portion of the wireless telecommunications network;
identify, in the wireless telecommunications network and during at least a second time window, a second set of PRBs, associated with the first portion of the wireless telecommunications network, that exhibit excessive interference compared to one or more other PRBs associated with the first portion of the wireless telecommunications network;
modify, during a third time window that occurs after the first and second time windows and based on identifying the first and second sets of PRBs associated with the first portion of the telecommunications network, utilization of at least one PRB, in the identified first and second sets of PRBs, at the first portion of the wireless telecommunications network;
identify, based on the first and second sets of PRBs, a first noise signature associated with the first portion of the wireless telecommunications network;
identify, using a correlation analysis, a second portion of the wireless telecommunications network that exhibits a second noise signature that is correlated with the first noise signature;
identify, based on the correlation analysis indicating that the second noise signature exhibited at the second portion of the wireless telecommunications network is correlated with the first noise signature exhibited at the first portion of the wireless telecommunications network;

a magnitude of interference exhibited on each PRB, of the first and second sets of PRBs, at the first portion of the wireless telecommunications network, and
a magnitude of interference exhibited on each PRB, of the first and second sets of PRBs, at the second portion of the wireless telecommunications network; and
determine a position of an interference source based on (a) the identified magnitude of interference exhibited on each PRB, of the first and second sets of PRBs, at the first portion of the wireless telecommunications network, (b) the identified magnitude of interference exhibited on each PRB, of the first and second sets of PRBs, at the second portion of the wireless telecommunications network, (c) a first geographic location that corresponds to the first portion of the wireless telecommunications network, and (d) a second geographic location that corresponds to the second portion of the wireless telecommunications network.

2. The device of claim 1, wherein executing the processor-executable instructions further causes the one or more processors to:
modify, during the third time window and based on identifying that the second portion of the wireless telecommunications network exhibits the second noise signature that is correlated with the first noise signature identified in the first portion of the wireless telecommunications network during the fourth time window, utilization of the at least one PRB at the second portion of the wireless telecommunications network.

3. The device of claim 1, wherein executing the processor-executable instructions, to identify the first set of PRBs that exhibit excessive interference, further causes the one or more processors to:
compare, for a first PRB in the first set of PRBs, a measure of interference, detected at the first PRB during the first time window, to an average measure of interference detected at two or more other PRBs associated with the portion of the wireless telecommunications network; and
determine, based on the comparing, that the measure of interference, detected at the first PRB during the first time window, exceeds the average measure of interference detected at the two or more other PRBs.

4. The device of claim 3, wherein executing the processor-executable instructions, to determine that the measure of interference, detected at the first PRB during the first time window, exceeds the average measure of interference detected at the two or more other PRBs, further causes the one or more processors to:
determine that the measure of interference, detected at the first PRB during the first time window, exceeds the average measure of interference detected at the two or more other PRBs by at least a threshold amount.

5. The device of claim 1, wherein executing the processor-executable instructions further causes the one or more processors to:
identify first noise signature associated with the first portion of the wireless telecommunications network during a fourth time window that includes the first time window and the second time window,
wherein using the correlation analysis includes determining that the second portion of the wireless telecommunications network exhibits the second noise signature during the fourth time window.

6. The device of claim 5, wherein executing the processor-executable instructions further causes the one or more processors to:
identify a third portion of the wireless telecommunications network that is located within a threshold distance of the determined position of the interference source; and
modify, based on identifying that the third portion of the wireless telecommunications network is located within the threshold distance of the determined position of the interference source, utilization of the at least one PRB at the third portion of the wireless telecommunications network.

7. The device of claim 1, wherein executing the processor-executable instructions, to modify the utilization of the at least one PRB, causes the one or more processors to:
cease utilizing the at least one PRB for at least a particular period of time after identifying the first and second sets of PRBs.

8. A non-transitory computer-readable medium, storing a set of processor-executable instructions, which, when executed by one or more processors, cause the one or more processors to:
identify, in a wireless telecommunications network and during a first time window, a first set of physical resource blocks ("PRBs"), associated with a first portion of the wireless telecommunications network, that exhibit excessive interference compared to one or more other PRBs associated with the same first portion of the wireless telecommunications network;
identify, in the wireless telecommunications network and during at least a second time window, a second set of PRBs, associated with the first portion of the wireless telecommunications network, that exhibit excessive interference compared to one or more other PRBs associated with the first portion of the wireless telecommunications network;
modify, during a third time window that occurs after the first and second time windows and based on identifying the first and second sets of PRBs associated with the first portion of the telecommunications network, utilization of at least one PRB, in the identified first and second sets of PRBs, at the first portion of the wireless telecommunications network;
identify, based on the first and second sets of PRBs, a first noise signature associated with the first portion of the wireless telecommunications network;
identify, using a correlation analysis, a second portion of the wireless telecommunications network that exhibits a second noise signature that is correlated with the first noise signature;
identify, based on the correlation analysis indicating that the second noise signature exhibited at the second portion of the wireless telecommunications network is correlated with the first noise signature exhibited at the first portion of the wireless telecommunications network:
a magnitude of interference exhibited on each PRB, of the first and second sets of PRBs, at the first portion of the wireless telecommunications network, and
a magnitude of interference exhibited on each PRB, of the first and second sets of PRBs, at the second portion of the wireless telecommunications network; and
determine a position of an interference source based on (a) the identified magnitude of interference exhibited on each PRB, of the first and second sets of PRBs, at the first portion of the wireless telecommunications network, (b) the identified magnitude of interference exhibited on each PRB, of the first and second sets of PRBs, at the second portion of the wireless telecommunications network, (c) a first geographic location that corresponds to the first portion of the wireless telecommunications network, and (d) a second geographic location that corresponds to the second portion of the wireless telecommunications network.

9. The non-transitory computer-readable medium of claim 8, wherein the processor-executable instructions further include processor-executable instructions to:
modify, during the third time window and based on identifying that the second portion of the wireless telecommunications network exhibits the second noise signature that is correlated with the first noise signature identified in the first portion of the wireless telecommunications network during the fourth time window, utilization of the at least one PRB at the second portion of the wireless telecommunications network.

10. The non-transitory computer-readable medium of claim 8, wherein the processor-executable instructions, to identify the first set of PRBs that exhibit excessive interference, further include processor-executable instructions to:
compare, for a first PRB in the first set of PRBs, a measure of interference, detected at the first PRB during the first time window, to an average measure of interference detected at two or more other PRBs associated with the portion of the wireless telecommunications network; and
determine, based on the comparing, that the measure of interference, detected at the first PRB during the first time window, exceeds the average measure of interference detected at the two or more other PRBs.

11. The non-transitory computer-readable medium of claim 10, wherein the processor-executable instructions, to determine that the measure of interference, detected at the first PRB during the first time window, exceeds the average measure of interference detected at the two or more other PRBs, further include processor-executable instructions to:
determine that the measure of interference, detected at the first PRB during the first time window, exceeds the average measure of interference detected at the two or more other PRBs by at least a threshold amount.

12. The non-transitory computer-readable medium of claim 8, wherein the processor-executable instructions further include processor-executable instructions to:
identify the first noise signature associated with the first portion of the wireless telecommunications network during a fourth time window that includes the first time window and the second time window,
wherein using the correlation analysis includes determining that the second portion of the wireless telecommunications network exhibits the second noise signature during the fourth time window.

13. The non-transitory computer-readable medium of claim 12, wherein the processor-executable instructions further include processor-executable instructions to:
identify a third portion of the wireless telecommunications network that is located within a threshold distance of the determined position of the interference source; and
modify, based on identifying that the third portion of the wireless telecommunications network is located within the threshold distance of the determined position of the interference source, utilization of the at least one PRB at the third portion of the wireless telecommunications network.

14. The non-transitory computer-readable medium of claim 8, wherein the processor-executable instructions, to modify the utilization of the at least one PRB, include processor-executable instructions to:
cease utilizing the at least one PRB for at least a particular period of time after identifying the first and second sets of PRBs.

15. A method, comprising:
identifying, by one or more processors of a device and in a wireless telecommunications network and during a first time window, a first set of physical resource blocks ("PRBs"), associated with a first portion of the wireless telecommunications network, that exhibit excessive interference compared to one or more other PRBs associated with the same first portion of the wireless telecommunications network;
identifying, by the one or more processors of the device, in the wireless telecommunications network, and during at least a second time window, a second set of PRBs, associated with the first portion of the wireless telecommunications network, that exhibit excessive interference compared to one or more other PRBs associated with the first portion of the wireless telecommunications network;
modifying, by the one or more processors of the device and during a third time window that occurs after the first and second time windows and based on identifying the first and second sets of PRBs associated with the first portion of the telecommunications network, utilization of at least one PRB, in the identified first and second sets of PRB s, at the first portion of the wireless telecommunications network;
identifying, based on the first and second sets of PRBs, a first noise signature associated with the first portion of the wireless telecommunications network;
identifying, using a correlation analysis, a second portion of the wireless telecommunications network that exhibits a second noise signature that is correlated with the first noise signature;
identifying, based on the correlation analysis indicating that the second noise signature exhibited at the second portion of the wireless telecommunications network is correlated with the first noise signature exhibited at the first portion of the wireless telecommunications network:
a magnitude of interference exhibited on each PRB, of the first and second sets of PRBs, at the first portion of the wireless telecommunications network, and
a magnitude of interference exhibited on each PRB, of the first and second sets of PRBs, at the second portion of the wireless telecommunications network; and
determining a position of an interference source based on (a) the identified magnitude of interference exhibited on each PRB, of the first and second sets of PRBs, at the first portion of the wireless telecommunications network, (b) the identified magnitude of interference exhibited on each PRB, of the first and second sets of PRBs, at the second portion of the wireless telecommunications network, (c) a first geographic location that corresponds to the first portion of the wireless telecommunications network, and (d) a second geographic location that corresponds to the second portion of the wireless telecommunications network.

16. The method of claim 15, further comprising:
modifying, during the third time window and based on identifying that the second portion of the wireless telecommunications network exhibits the second noise signature that is correlated with the first noise signature identified in the first portion of the wireless telecommunications network during the fourth time window, utilization of the at least one PRB at the second portion of the wireless telecommunications network.

17. The method of claim 15, wherein identifying the first set of PRBs that exhibit excessive interference further includes:
comparing, for a first PRB in the first set of PRBs, a measure of interference, detected at the first PRB during the first time window, to an average measure of interference detected at two or more other PRBs associated with the portion of the wireless telecommunications network; and
determining, based on the comparing, that the measure of interference, detected at the first PRB during the first time window, exceeds the average measure of interference detected at the two or more other PRBs.

18. The method of claim 17, wherein determining that the measure of interference, detected at the first PRB during the first time window, exceeds the average measure of interference detected at the two or more other PRBs, further includes:
determining that the measure of interference, detected at the first PRB during the first time window, exceeds the average measure of interference detected at the two or more other PRBs by at least a threshold amount.

19. The method of claim 15, further comprising:
identifying the first noise signature associated with the first portion of the wireless telecommunications network during a fourth time window that includes the first time window and the second time window,
wherein using the correlation analysis includes determining that the second portion of the wireless telecommunications network exhibits the second noise signature during the fourth time window.

20. The method of claim 19, further comprising:
identifying a third portion of the wireless telecommunications network that is located within a threshold distance of the determined position of the interference source; and
modifying, based on identifying that the third portion of the wireless telecommunications network is located within the threshold distance of the determined position of the interference source, utilization of the at least one PRB at the third portion of the wireless telecommunications network.

* * * * *